(12) United States Patent
Jeyabalan et al.

(10) Patent No.: US 11,475,921 B1
(45) Date of Patent: Oct. 18, 2022

(54) PER COMPONENT SCHEDULERS MAKING GLOBAL SCHEDULING DECISION

(71) Applicant: Amazon Technologies, Inc., Seattle, WA (US)

(72) Inventors: Gowtham Jeyabalan, Seattle, WA (US); Shubham Chandra Gupta, Seattle, WA (US); Jonathan Hedley, Seattle, WA (US); Nitin Singhal, Mercer Island, WA (US); Mark Hawley Yang, Seattle, WA (US); Jiazhi Ou, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 149 days.

(21) Appl. No.: 16/996,607

(22) Filed: Aug. 18, 2020

(51) Int. Cl.
| | |
|---|---|
| G11B 27/06 | (2006.01) |
| G11B 27/10 | (2006.01) |
| G06F 9/48 | (2006.01) |
| G06N 20/00 | (2019.01) |
| G06N 5/04 | (2006.01) |
| G06F 9/54 | (2006.01) |
| G06V 20/40 | (2022.01) |

(52) U.S. Cl.
CPC ............ *G11B 27/06* (2013.01); *G06F 9/4881* (2013.01); *G06F 9/541* (2013.01); *G06N 5/04* (2013.01); *G06N 20/00* (2019.01); *G06V 20/41* (2022.01); *G06V 20/49* (2022.01); *G11B 27/102* (2013.01); *G06F 2209/486* (2013.01)

(58) Field of Classification Search
CPC ...................................................... G11B 27/06
See application file for complete search history.

(56) References Cited

U.S. PATENT DOCUMENTS

2021/0216777 A1* 7/2021 Chaudhury .......... G06K 9/6226

* cited by examiner

*Primary Examiner* — Daniel T Tekle
(74) *Attorney, Agent, or Firm* — Nicholson De Vos Webster & Elliott LLP

(57) ABSTRACT

Techniques for analyzing stored video upon a request are described. For example, a method of receiving a first application programming interface (API) request to analyze a stored video, the API request to include a location of the stored video and at least one analysis action to perform on the stored video; scheduling a job for the first API request using a global scheduler, the global scheduler to schedule, based at least in part on available bandwidth of processing components including a segmenter, a chunk processor, and a reducer, at least one job queue associated at least one of the processing components; accessing the location of the stored video to retrieve the stored video; segmenting the accessed video into chunks; processing each chunk with a chunk processor to perform the at least one analysis action, each chunk processor to utilize at least one machine learning model in performing the at least one analysis action; joining the results of the processing of each chunk to generate a final result; storing the final result; and providing the final result to a requestor in response to a second API request is described.

20 Claims, 10 Drawing Sheets

US 11,475,921 B1

PER COMPONENT SCHEDULERS MAKING GLOBAL SCHEDULING DECISION

BACKGROUND

Video is becoming more prevalent in everyday use. For example, stores are opening that solely use video to track purchasers, camera feeds are used to detect license plates, etc. The volume of video is immense and ever changing.

BRIEF DESCRIPTION OF DRAWINGS

Various embodiments in accordance with the present disclosure will be described with reference to the drawings, in which.

DETAILED DESCRIPTION

Figure 1:
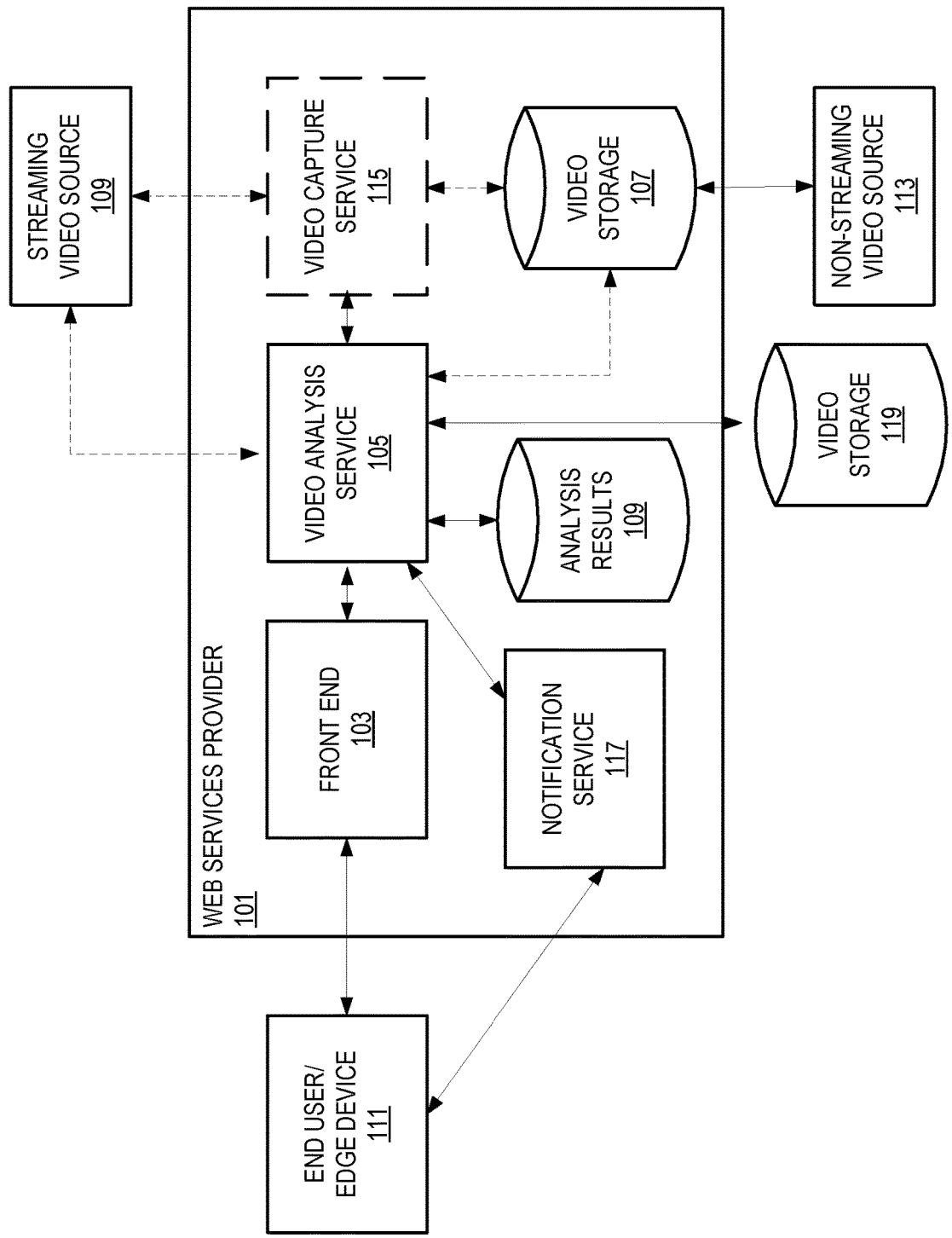
FIG. 1 illustrates embodiments of a web services provider capable of performing video analysis.

Various embodiments of methods, apparatus, systems, and non-transitory computer-readable storage media for video analysis (both archived and streaming) as a web service are described. In some embodiments, application programming interfaces (APIs) for object, object, and/or activity detection in videos are detailed. Video analysis as a web service allows for analytics to be performed on video captured from an end user/edge device. For example, a web camera does not typically have hardware to analyze the video that it captures. Through the offloading of the analytical processing of the video to a web services provider, the video can be analyzed. In some embodiments, this analysis is done in real-time, or near real-time. Additionally, the web services provider allows for the automatic provisioning and elastic scaling of the infrastructure needed to ingest and process streaming video data. Additionally, video streams from the same entity can be analyzed together (for example, tracking an object from camera-to-camera in a store).

In some iterations of a video analysis service, there can be a noisy neighbor problem of messages from single user taking all the bandwidth of the system and impacting other users' jobs. Detailed herein are embodiments of a video analysis service that attempt to address this problem. In particular, a global, per component scheduler, schedules jobs from a pending list per component. Additionally, when available, event-based job scheduling is done when there is available bandwidth.

Embodiments of a video analysis service capable of working on a large scale, elastic, distributed, and highly available platform offering developers to apply pre-trained ML models including, but not limited to content moderation, object and activity classification, object detection and recognition, object tracking, and object recognition are described. In some embodiments, the web services provider scales to accommodate additional processing elements like optical character recognition (OCR), automatic speech recognition (ASR) and other capabilities.

In some embodiments, the video analysis service uses a microservices style approach for vending video recognition capabilities siloed in video segmenter, processing, and aggregator workers loosely resembling a scatter gather approach to establish effective service level agreements (SLAs) around latency and throughput. In some embodiments, the video analysis service supports both batch oriented and streaming media inputs, and reuses aspects around—key frame selection, containerization of video processing elements, inference service pipelines, and supplemental aspects of authentication & authorization, billing, metrics, and logging. For batch-oriented jobs, in some embodiments, the video is fanned out into configurable size chunks that are processed independently. This enables parallel processing within a video, thereby facilitating better end-to-end latencies. At a later step, feature specific aggregation of the individual chunk results through parametric smoothing both spatially and temporally. The video analysis service is tolerant to failures (for example, failures of underlying hardware or service failures), and, in some embodiments, is able to restart the processing of a batch or a streaming job from the last known good checkpointed state. In some embodiments, the video analysis service has an integrated notification component to send messages that track how the job is being handled including scheduling events, any partial failures, lag build ups, etc.

FIG. 1 illustrates embodiments of a web services provider capable of performing video analysis. An end user/edge device 111 communicates with the web services provider 101 to start video analysis and/or get results of the video analysis. The communications are in the form of application programming interface (API) calls in some embodiments.

The web services provider 101 includes several different components. Each of these components is software store in memory and executed by a processor in some embodiments. The particular hardware used for most of the components may be user selected. For example, the video analysis service 105 may perform better on application specific hardware, or using an accelerator as opposed to a general-purpose central processor. In other embodiments, one or more of the components are determined by the web services provider based on requirements of the end user (such as latency, cost, etc.).

A front end 103 receives the communications from the end user/edge device 111. In some embodiments, the front end 103 forwards the communications to video analysis service 105 to start video analysis and/or get results of the video analysis. In other embodiments, the front end 103 translates the communications into a format the video analysis service 105 understands to cause the video analysis service 105 to start video analysis and/or get results of the video analysis.

The video analysis service 105 analyzes video. In some embodiments, the video analysis service 105 performs at least one or more of object tracking, object detection, label detection, object recognition, content moderation, and/or searching as directed by the end user/edge device 111.

The video may be streaming (dynamic) from a streaming video source 109 or stored (static) in video storage 107 either from a streaming video source 109, or from a non-streaming video source 113. In some embodiments, video stored in video storage 107 is encrypted and is protected from unauthorized access. Additionally, in some embodiments, video is externally stored in video storage 119.

In some embodiments, a streaming video source 109 provides the streaming video directly to the video analysis service 105. In other embodiments, a streaming video source 109 provides the streaming video to a video capture service 115 which makes the streaming video accessible to the video analysis service 105. In some cases, the video capture service 115 stores the streaming video in video storage 107 (making the stream static). In some embodiments, the video capture service 115 securely connects to the streaming video source 109 and encrypts and indexes video it receives. As detailed above, video storage 107 may also receive video from a non-streaming video source 113. For example, an H.264 file is uploaded to the video storage.

Results of any analysis performed by the video analysis service 105 are stored as analysis results 109. In some embodiments, the analysis results 109 are accessible via the front end 103. In some embodiments, the analysis results 109 are accessible more directly.

In some embodiments, video analysis service 105 provides a notification of completion to a notification service 117 which the informs the requesting user/device 111 that results are available.

Figure 2:
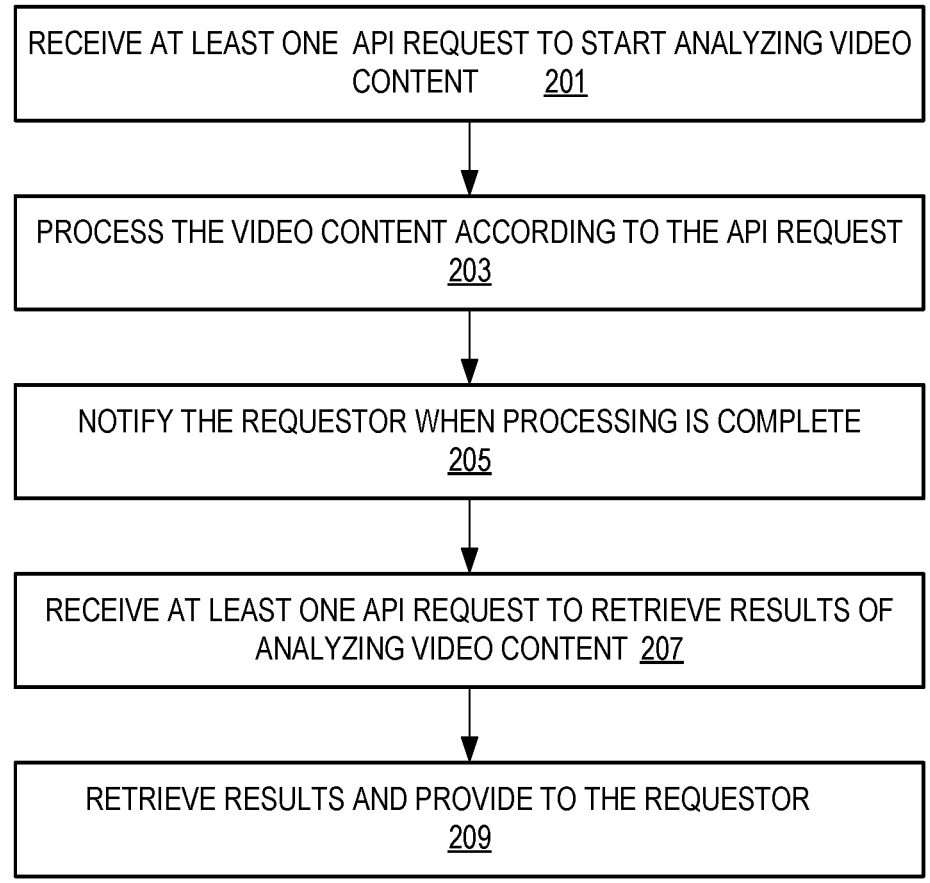
FIG. 2 illustrates embodiments of a method.

FIG. 2 illustrates embodiments of a method. In some embodiments, the method is performed by a video analysis service. In some embodiments, the requests discussed below are received at a front end of a web services provider. At 201, one or more API requests to start analyzing video content are received. Examples of API requests include, but are not limited to: start content moderation, start object detection, start label detection, start object tracking, start object recognition, create stream processor, and start stream processor. Note that multiple API requests may be submitted at one time in some embodiments.

A start content moderation request starts detection of explicit or suggestive adult content in a video. The location of the video (such as storage location or stream) is provided in the request. In some embodiments, the request includes a location or means for reporting a notification using a job tag of the request when the detection is complete. A job tag is provided to identify the job. A job identifier is provided by the video analysis service and is used to find the results of the content detection.

A start object detection request starts detection of objects in a video. The location of the video (such as storage location or stream) is provided in the request. In some embodiments, the request includes a location or means for reporting a notification using a job tag of the request when the detection is complete. A job identifier is provided by the video analysis service is used to find the results of the object detection. Results of the object tracking may include labels of objects and names if the object has previously been labeled. Further, in some embodiments, the request includes the object attributes that are to be returned (such as bounding box, confidence, pose, quality, and landmarks).

A start object tracking request starts detection of objects in a video. The location of the video (such as storage location or stream) is provided in the request. In some embodiments, the request includes a location or means for reporting a notification using a job tag of the request when the label detection is complete. Results of the object tracking may include labels of objects and names if the object has previously been labeled. A job identifier is provided by the video analysis service and that identifier is used to find the results of the object tracking.

A start label tracking request starts detection of labels in a video. Labels are instances of real-world entities and include objects like a flower, a tree, and a table; events; concepts like landscape, evening, and nature; and activities. The location of the video (such as storage location or stream) is provided in the request. In some embodiments, the request includes a location or means for reporting a notification using a job tag of the request when the label detection is complete. A job identifier is provided by the video analysis service and is used to find the results of the label tracking.

A start object recognition request starts object detection in a video. The location of the video (such as storage location or stream) is provided in the request. In some embodiments, the request includes a location or means for reporting a notification using a job tag of the request when the label detection is complete. Results of the object tracking may include labels of objects in the video. The video analysis service can the use the label to determine who the object is (for example, upon request). A job identifier is provided by the video analysis service and is used to find the results of the object recognition.

In some embodiments, a stream processor is created and then started before the above requests can be run.

The video content is processed according to the API request and the results stored at 203. Exemplary specifics of how processing occurs are detailed later.

At 205, the requestor is notified once the processing is complete. For example, a notification service alerts the requester that a particular job is complete.

At some later point in time, at least one API request is received to retrieve results of analyzing the video content at 207. Examples of API requests include, but are not limited to: get content moderation, get object detection, get label detection, get object tracking, start segment tracking, etc. Note that multiple API requests may be submitted at one time in some embodiments. Each "get" request includes the job identifier from the corresponding "start" request.

The results are retrieved based on the job identifier(s) and provided to the requestor at 209.

Figure 3:
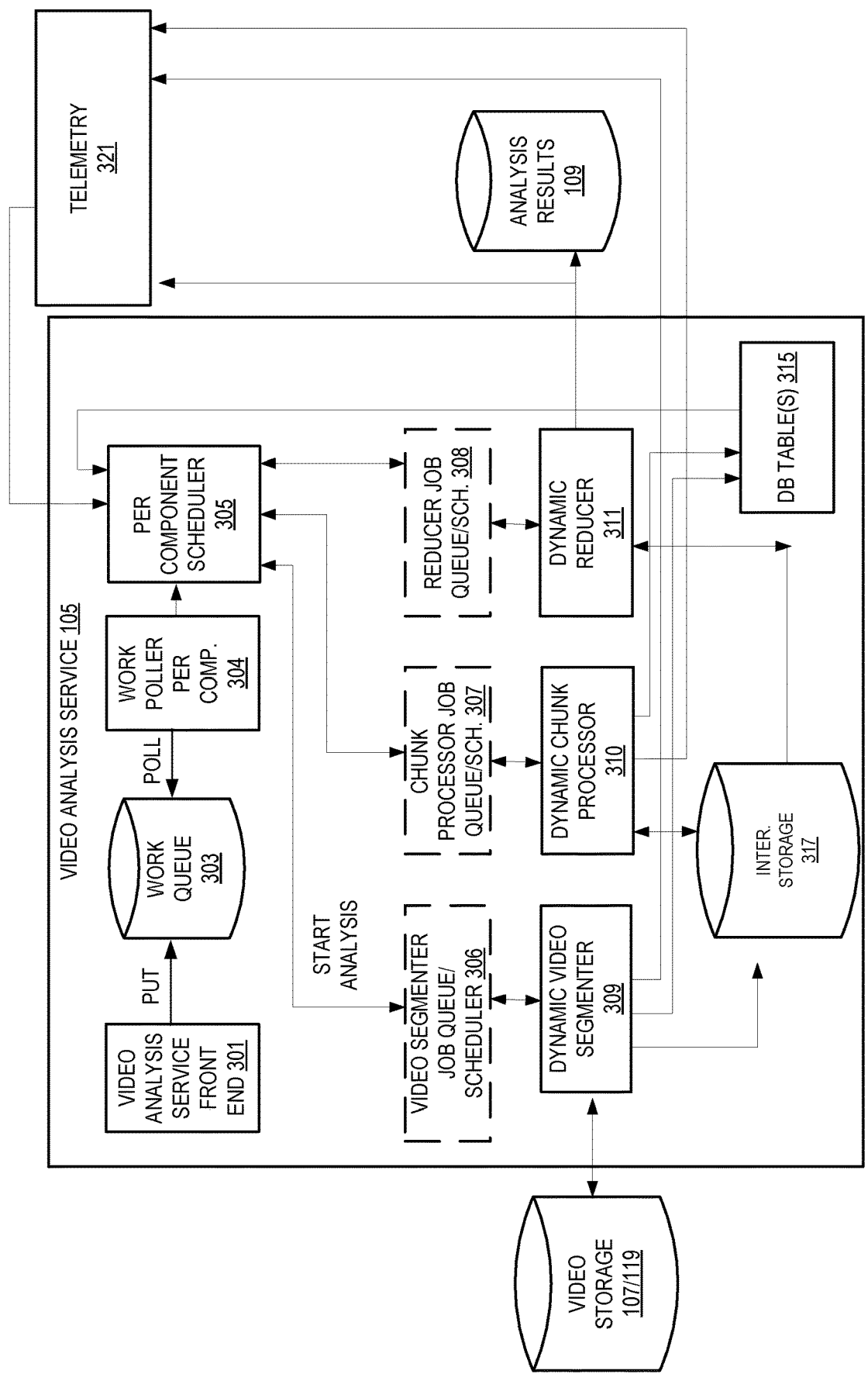
FIG. 3 illustrates embodiments of a video analysis service for archived video.

FIG. 3 illustrates embodiments of a video analysis service for archived video. A request to analyze a video stream is received by a video analysis service front end 301. The request is typically received via an API call as detailed above. In this illustration there are several processing components (e.g., a dynamic video segmenter 309, a dynamic chunk processor 310, and a dynamic reducer 311) and several scheduling components (e.g., a per component scheduler 305, a video segmenter job queue/scheduler 306, a chunk processor job queue/scheduler 307, and/or a reducer job queue/scheduler 308). The processing components are noted as being dynamic in that they can be scaled to meet demand (e.g., adjusting processing and/or memory resources for more complex jobs, etc.).

The video analysis service front end 301 puts the request as work in a work queue 303 to be processed at a later point. In some embodiments, the video analysis service front end 301 returns state of the jobs to the API consumer. In some embodiments, the front end 301 validates credentials, gets metadata of the object to validate size, and generates a temporary link that is used for inputting the content into the dynamic video segmenter 309.

A per component work manager/poller 304 polls the job queue 303 for a job to be handled per processing component and adds the job information to pending list (per processing component) that the per component scheduler 305 accesses to schedule jobs using one or more of the video segmenter job queue/scheduler 306, the chunk processor job queue/scheduler 307, and the reducer job queue/scheduler 308 based on based on available bandwidth. Note that dependenting upon the embodiment, not all of the video segmenter job queue/scheduler 306, the chunk processor job queue/scheduler 307 are a part of the video analysis service. For example, in some embodiments, only the video segmenter job queue/scheduler 306 is used. In other embodiments, only the video segmenter job queue/scheduler 306 and the chunk processor job queue/scheduler 307 are used, etc.

As noted, the per component scheduler 305 schedules jobs using one or more of the video segmenter job queue/scheduler 306, the chunk processor job queue/scheduler 307, and the reducer job queue/scheduler 308 based on based on available bandwidth. In some embodiments, the per component scheduler 305 utilizes a minimum and maximum processing limit for each of the queues and schedules jobs for each queue between this limit based on fair-sharing the available bandwidth. In some embodiments, the per component scheduler 305 is responsible for one or more of: tracking status of individual jobs; bounding number of jobs in pending state for a user; job prioritization; aging; and support using facing visibility APIs such as getting status of a job and getting all user submitted jobs within a time frame. The minimum processing limit helps the per component scheduler 305 to schedule at least one job for a user who has no jobs in progress even when the system is under load. In some embodiments, the available bandwidth of a processing component (e.g., the segmenter 309) is determined by looking at a video length processed metric and thread utilization of the processing component (for example, Total VideoLengthToSchedule=TotalVideoLengthProcessed* (100/WorkerUtilizationPercentage))

One or more database table(s) 315 track the status of a job (e.g., how much has been segmented over a period of time, etc.) as it is processed in each processing component. The per component scheduler 305 utilizes this information as a part of its scheduling decision (e.g., to calculate what has been processed, etc.). Note the compute capacity for any of the processing components can be scaled in some embodiments and the per component scheduler 305 can take that into account along with "niceness" or priority can be adjusted based per client, task, etc. In some embodiments, a pending list and in progress jobs list are implemented in the one or more database table(s) 315.

As shown, there is a job queue/scheduler per processing component, and each has a maximum and minimum processing limit. Generally speaking, wherein there are no global jobs in progress, the minimum amount of work is scheduled from its queue. Note that as tasks are completed by each processing component, the processing component updates the "next" queue/scheduler in the chain as illustrated. Additionally, each queue/scheduler updates a preceding queue/scheduler upon either a scheduling or completion, and the per component scheduler 305.

The dynamic video segmenter 309 accesses a data storage 107/119 (e.g., a database) storing video. In some embodiments, the dynamic video segmenter 309 segments a video into smaller chunks that can be processed independently to optimize for throughput and latency. In some embodiments, a secondary role is extracting metadata for the video (for example, duration, bitrate, frames per second, etc.). For overlapping video segments, some of the processing elements (like activity detection) may require overlapping video segments. Creating video for each segment and uploading them versus storing segment start and end byte reference within the video and using byte range-based access may optimize uploads. The dynamic video segmenter 309 also determines a size of each segment.

After chunking, the dynamic video segmenter 309 updates the video segmenter job queue/scheduler 306 and/or database table(s) 315 with status information. The dynamic video segmenter 309 also stores the chunks in an intermediate storage 317. Note the intermediate storage may be video storage 107/119.

The dynamic chunk processor 310 runs all the aspects of video content analysis that includes object and object detection on the frames extracted from chunks based on jobs in its queue/scheduler 307 in some embodiments. In some embodiments, the dynamic chunk processor 310 is containerized and would make a call to the processing service for getting label detection, object detection, object feature extraction and activity classification. In some embodiments, intermediate results are persisted back, along with the frame information for the reduce phase. In some embodiments, the dynamic chunk processor 310 defines the contract for: input, output, error and exceptions, and run time footprint and resources required. The dynamic chunk processor 310 may also perform a choreography of unit workers (for example, frame-based analysis, activity detection, tracking, etc.) to pass derivatives of one step into another unit. For every n chunks completed processing for any job, the chunk processor job queue/scheduler 307 or the per component scheduler 305 schedules n more additional chunks for the job. In some embodiments, when a job is marked for speed up, additional chunks are scheduled for processing for the job.

After processing, the dynamic chunk processor 310 updates one or more of its job queue/scheduler 307 and the database table(s) 315 with status information, and stores the analyzed chunks in intermediate storage 317. In some embodiments, a reducer/aggregator 311 gathers the results of the dynamic chunk processor 310 from the intermediate storage 317 and applies a join on the information and stores the result in analysis results 109.

In some embodiments, the dynamic chunk processor 310 is one or more containers and include models for label detection, object detection, object feature extraction and activity classification models as needed. In other embodiments, the dynamic chunk processor 310 is one or more virtual machines and call for label detection, object detection, object feature extraction and activity classification models as needed.

The outputs of the dynamic reducer 311, dynamic video segmenter 309, and dynamic chunk processor 309 are shared with a telemetry service 321 which collects metrics from the video analysis service 105 and provides those metrics to the per component scheduler 305. The per component scheduler 305 then uses this information to determine an available bandwidth for its downstream components (the dynamic video segmenter 309, dynamic chunk processor 310, and dynamic reducer 311). Examples of metrics may include, but are not limited to: a successful request count, a throttle count, a response time, detected counts of objects, server error counts, user error counts, etc.

Figure 4:
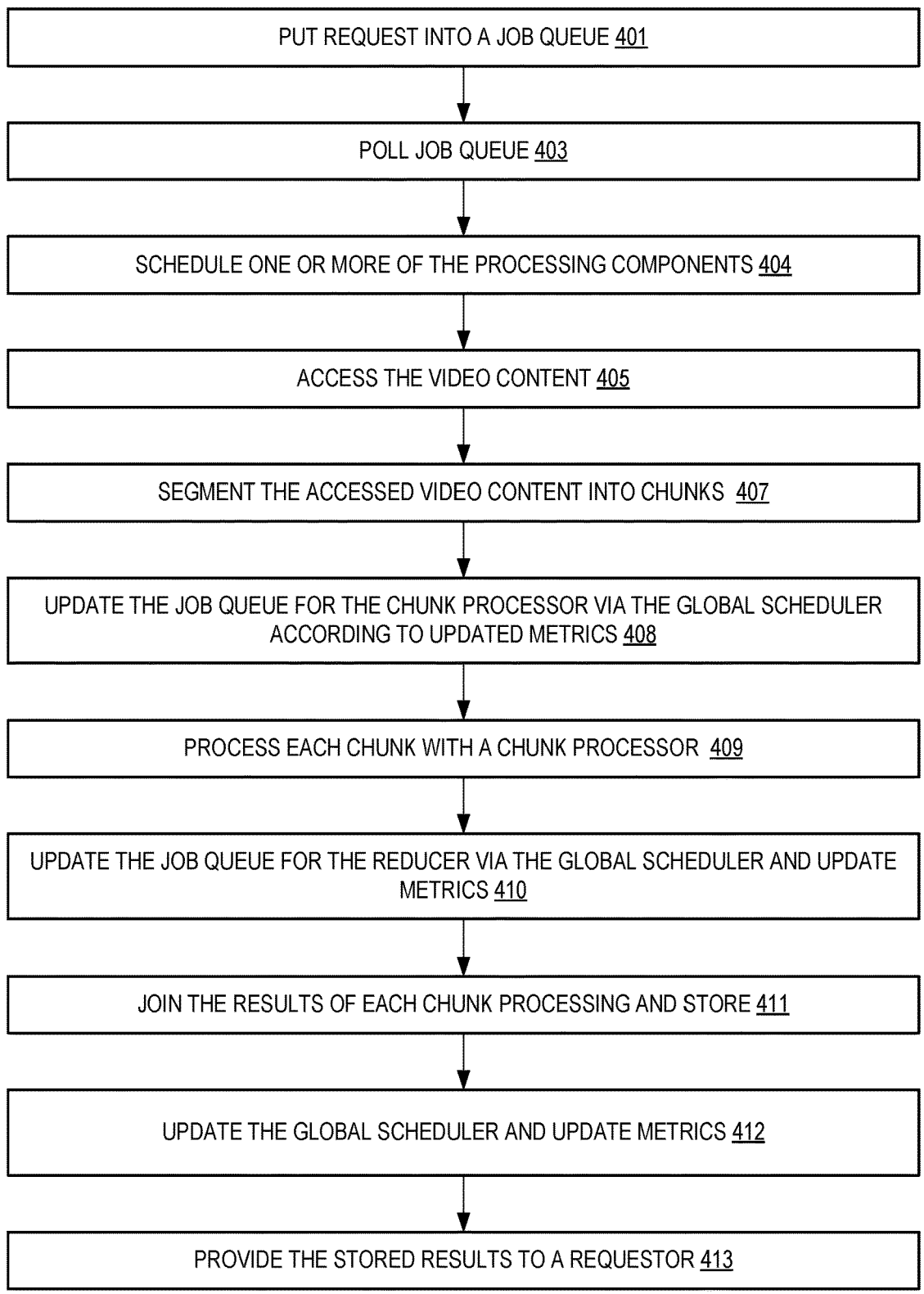
FIG. 4 illustrates embodiments of a method for performing stored video analysis.

FIG. 4 illustrates embodiments of a method for performing stored video analysis. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by components of the other figures.

At 401, a request in put into a job queue in some embodiments. For example, a start object recognition request is placed into a job queue. In some embodiments, a job ID is given to the requestor to use for retrieval of the results of the stored video analysis.

At 403, as resources free, the job queue is polled for a job. Using the start object recognition request job as a continuing example, this job is retrieved.

At 404, one or more of the processing components are scheduled using a global, per component scheduler. In some embodiments, one or more of the processing compones has a corresponding a job queue/scheduler as detailed above. For example, a queue for each of these processing components is updated to reflect a job or tasks thereof to complete. A more detailed explanation of embodiments of a method of scheduling are detailed in FIG. 5.

The video content associated with the retrieved job is accessed at 405. For example, the video file in a database that object recognition is requested to be run on.

The accessed video is segmented into chunks at 407. In some embodiments, the size of the chunks is determined by a front end of the video analysis service. Chunks are one or more frames. Upon the completion of the segmentation, in some embodiments, a job queue for a chunk processor is updated at 408 to indicate that the chunk processor is to analyze one or more segments based on output from the segmenter. This update may be done by metrics of a database or directly from queue for the scheduler.

At 409, each chunk is processed with a chunk processor. Upon the completion of the segmentation, a job queue, if used, for a reducer is updated at 410 to indicate that at least some analysis has been performed and may be ready for joining. This update is typically performed by the global scheduler based on information from the chunk processor.

The results of each chunk processing are joined to form a final result at 411 and stored for retrieval. In some embodiments, a notification to the requestor may also be made. Upon the completion of the reduction, the global scheduler and metrics for the job are updated at 412 to indicate that at least some joining has been performed and the reducer may be ready for more joining.

At 413, the stored results are provided to the requestor in response to a "get" API request.

Figure 5:
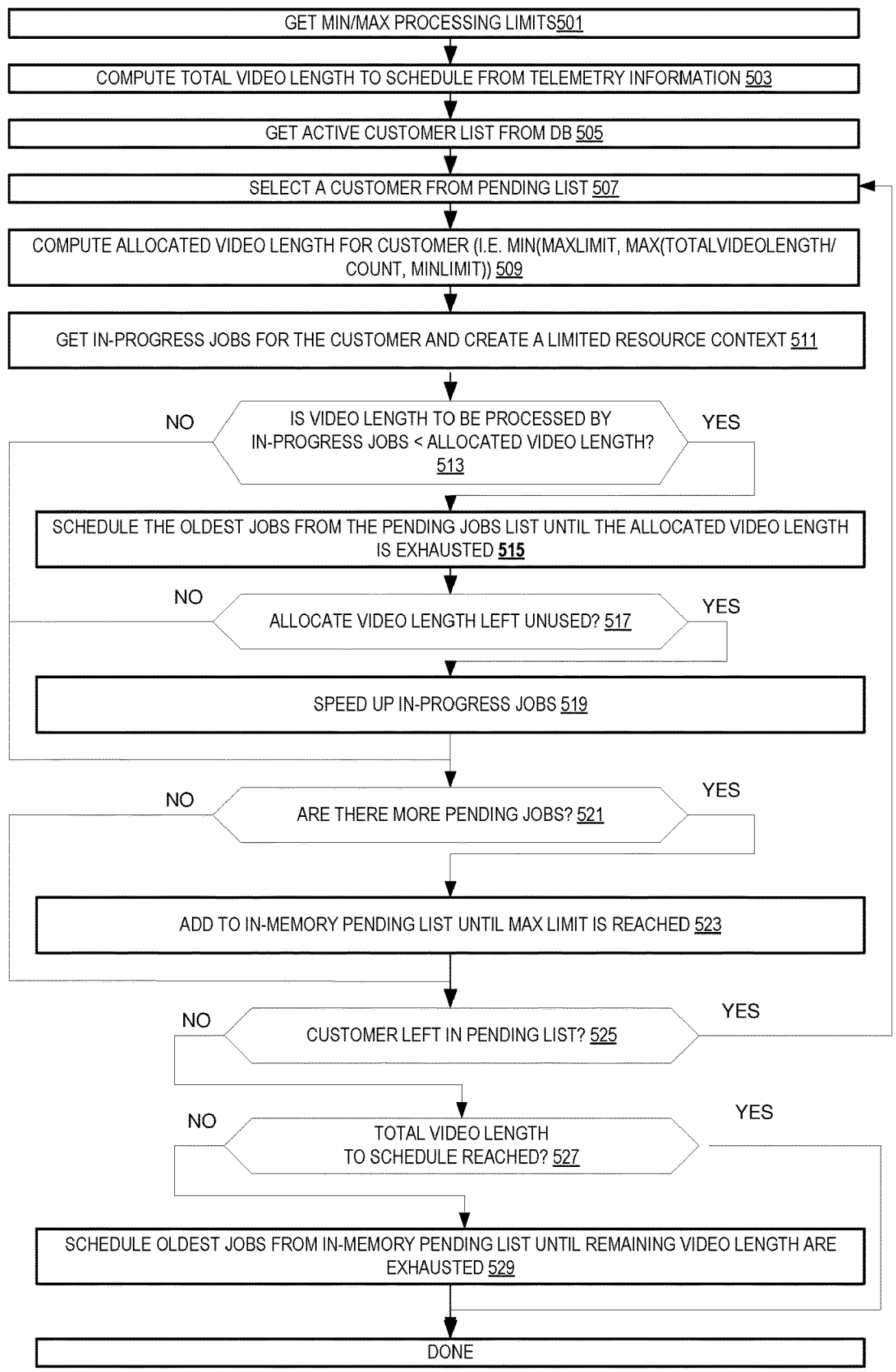
FIG. 5 illustrates embodiments of a method for scheduling in a video analysis service.

FIG. 5 illustrates embodiments of a method for scheduling in a video analysis service. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by components of the other figures. In particular, global scheduling one or more processing components. In some embodiments, the per component scheduler 305 performs one or more of these activities.

At 501, minimum and maximum processing limits for each user are determined. These may be set based on a particular user, a priority, etc.

At 503, a total video length to schedule from telemetry information is calculated. An exemplary calculation was detailed above, but the length takes into account how much of the video has been processed and how the individual processing components are utilized. In some embodiments, the total video length to schedule is fair-shared among the active users along with min/max processing limit considerations. For example, per user=min(maximum limit of the processing resources, max(total video length to schedule/number of users, minimum limit of the customers).)

An active user list is retrieved from a database at 505 and a component to schedule is selected at 507. Selection may be based on fairness, priority, complexity, latency, etc.

An allocated video length for the selected user is computed at 509. For example, in some embodiments, this length is the minimum of (maxlimit, max(total video length/users count, minlimit)), wherein maxlimit and minlimit are the smallest and largest supported lengths.

At 511, in-progress jobs for the user are acquired and a limited resource context is created. A context conveys how much video length is processed for each resource.

At 513 a determination is made of if the video length to be processed by in-progress jobs is less than the allocated video length. When the limit for a resource is met at any point, further scheduling or speeding of the jobs which has dependency of this limited resource will be skipped. As such, when the in-progress jobs size is less than the allocation video length, then an oldest job (or jobs) is scheduled from the pending jobs list for the resource until the allocated video length is exhausted at 515.

A determination is then made of if there is any allocated video length left unused at 517. If there is, then in-progress jobs are sped up until the remaining video length to schedule has been exhausted at 519.

When there is video length to be processed is greater than or equal to the allocated video length, then a determination of if there are any more pending jobs is made at 521. This is also what happens when the remaining video length has been exhausted.

When there are more pending jobs, then the are added to the list of pending jobs in the worker poller for the component at 523 until a maximum amount of jobs is added. After this addition, or when there are no more pending jobs, a determination if there are users left in the pending list is made at 525. In other words, are there more users to schedule? If yes, then another user is selected at 507.

If not, then a determination of if the entire video length to schedule has been reach is made at 527. To put it another way, has the video been scheduled? If so, then the scheduling flow ends as the video has been fully processed (or at least scheduled to be processed). If not, then the oldest jobs from the list of pending jobs are scheduled until the entire video length has been exhausted at 529.

Figure 6:
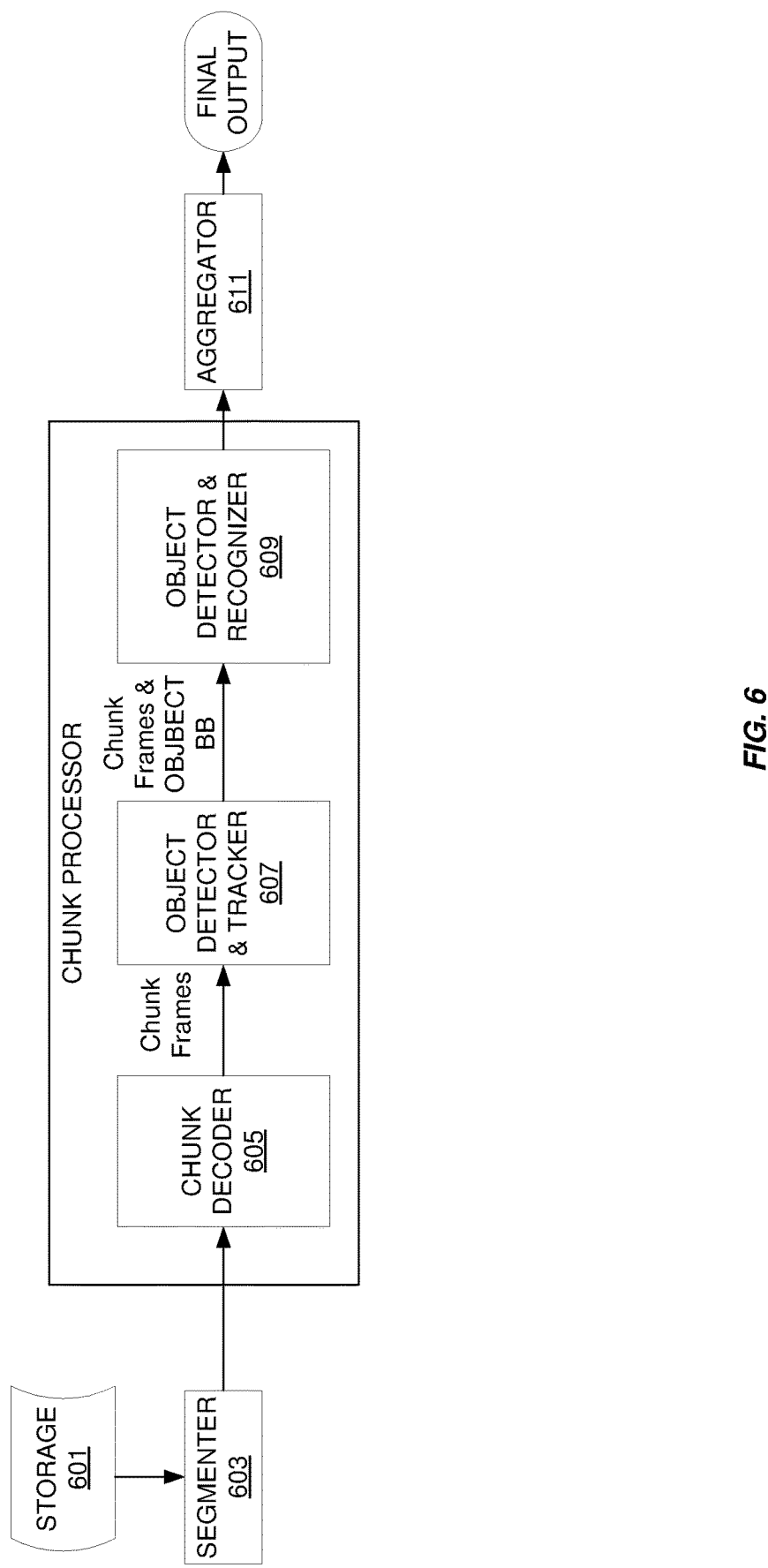
FIG. 6 illustrates embodiments of data flow between components according to some embodiments.

FIG. 6 illustrates embodiments of data flow between components according to some embodiments. Storage 601 stores video content. Segmenter 603 accesses the video of the storage 601 and provides chunks to the chunk processor (such as those detailed above).

The chunk processor's decoder 605 receives and decodes each chunk into chunk frames. The chunk frames are provided to an object detector and tracker 607 in some embodiments. For example, when object detection and tracking is requested the object detector and tracker 607 analyzes the chunks to find objects and track them across frames. In some embodiments, the object detector and tracker 607 analyzes the chunks and outputs tracklets on a per frame resolution. In some embodiments, this data is fed along with sampled frames (such as 10% of the original frames) to the object detector and extractor 609 which proposes an object match.

In some embodiments, an aggregator 611 processes per chunk output to produce the results over the entire video that includes a per frame object bounding box, object bounding box (in sampled frames), and object matches as requested. In some embodiments, the aggregator 611 performs the match between objects.

The object detector and tracker 607, object detector and extractor 609, and aggregator 611 of the chunk processor are machine learning models executing in a virtual machine in some embodiments. The object detector and tracker 607, object detector and extractor 609, and aggregator 611 of the chunk processor are machine learning models that are a part of a container in some embodiments.

Figure 7:
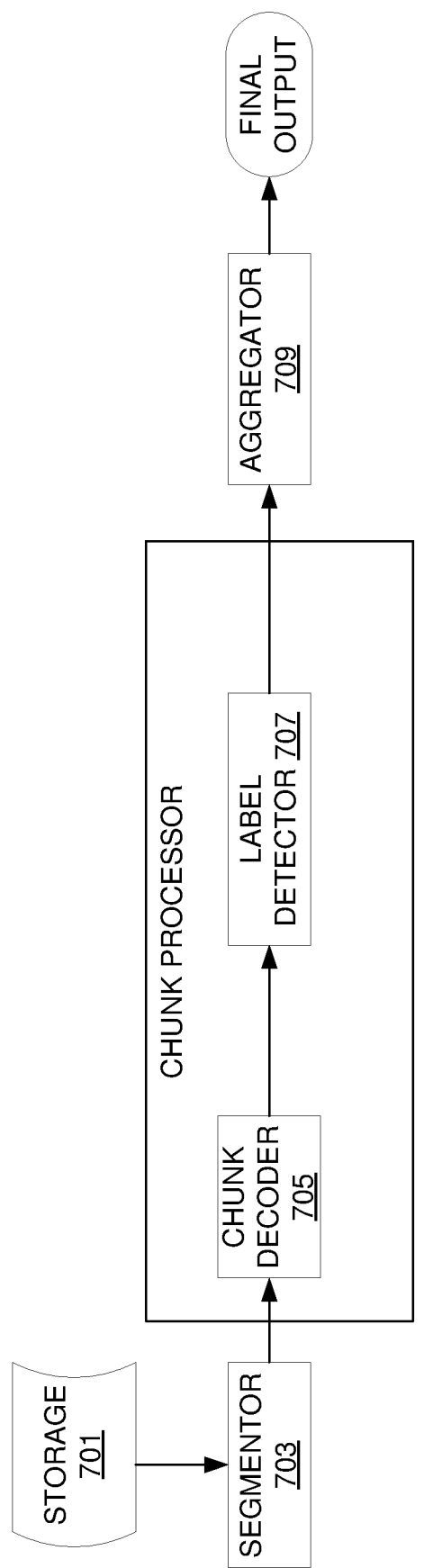
FIG. 7 illustrates embodiments of data flow between components according to some embodiments.

FIG. 7 illustrates embodiments of data flow between components according to some embodiments. Storage 701 stores video content. Segmenter 703 accesses the video of the storage 701 and provides chunks to the chunk processor.

The chunk processor's decoder 705 receives and decodes each chunk into chunk frames. The chunk frames are provided to a label detector 707 in some embodiments. In some embodiments, processes the chunks and outputs labels on a per frame resolution.

In some embodiments, an aggregator 709 processes per chunk output, to produce the results over the whole video that includes a per sampled frame label matches.

The label detector 707 of the chunk processor is a machine learning model executing in a virtual machine in some embodiments. The label detector 707 of the chunk processor is a machine learning model that is a part of a container in some embodiments.

In some embodiments, the workflow orchestration is decoupled from activity logic. In these embodiments, the video segmenters, chunk processors, and reducers detailed above are activities. Each activity implements a defined interface and is agnostic to activities up/below the chain. Further, these activities are idempotent and do not carry knowledge of workflow state. An activity is concerned with how to implement its contract and stays agnostic to workflow orchestration.

In some embodiments, each activity is associated with a work queue. Activity is wrapped around a work queue client that polls this work queue and invokes activity when it receives a task.

In some embodiments, job orchestration is decentralized, and each activity worker depends on the orchestrator package. The orchestrator picks up the task event, validates state, performs transformation and deserialization before invoking a task. Every activity exposes an invocation contract that specifies the input work queue, output work queue, timeout and retry policies. Post activity invocation, orchestrator looks up the job definition to figure out next task to execute and update the workflow state.

Figure 8:
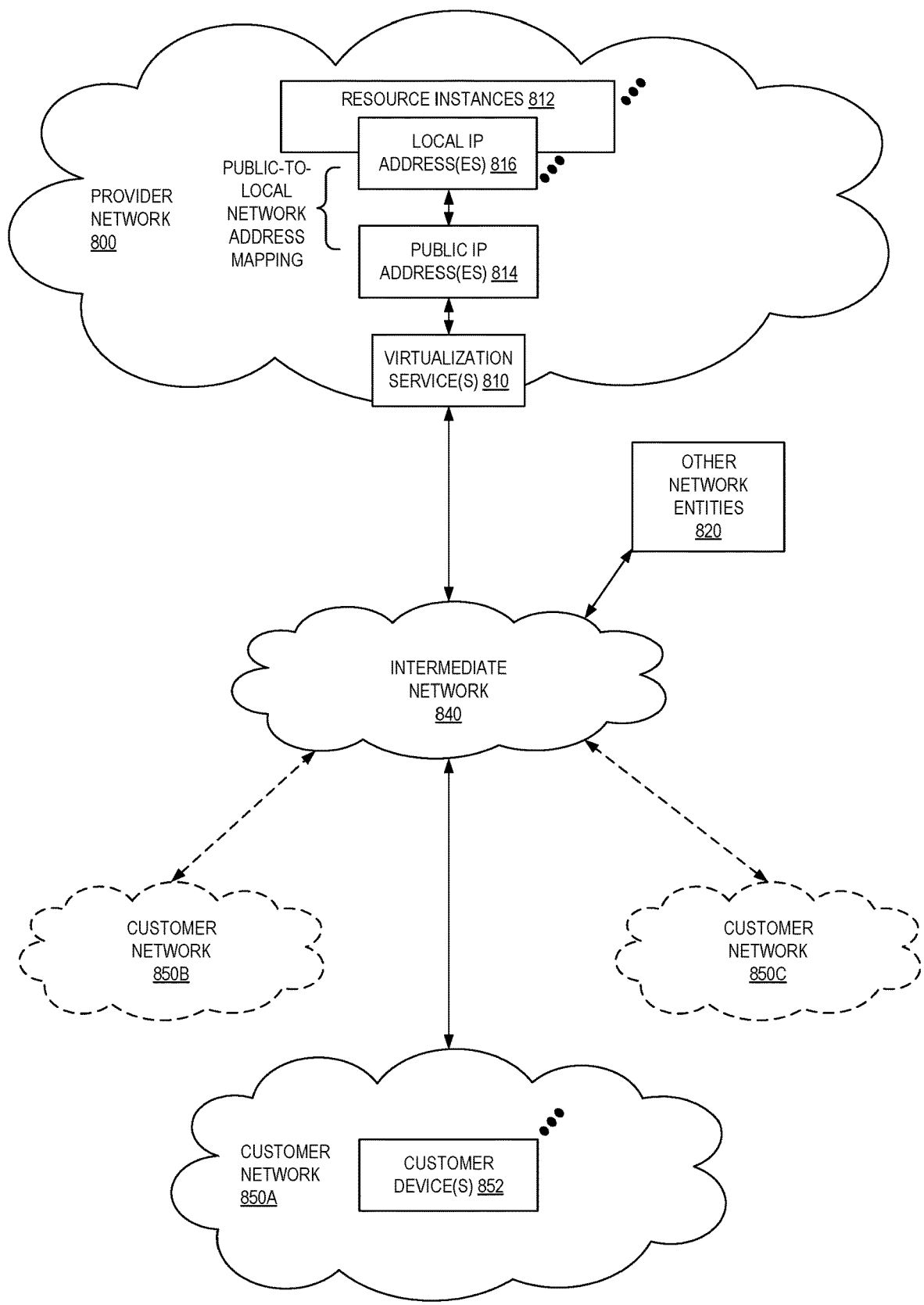
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
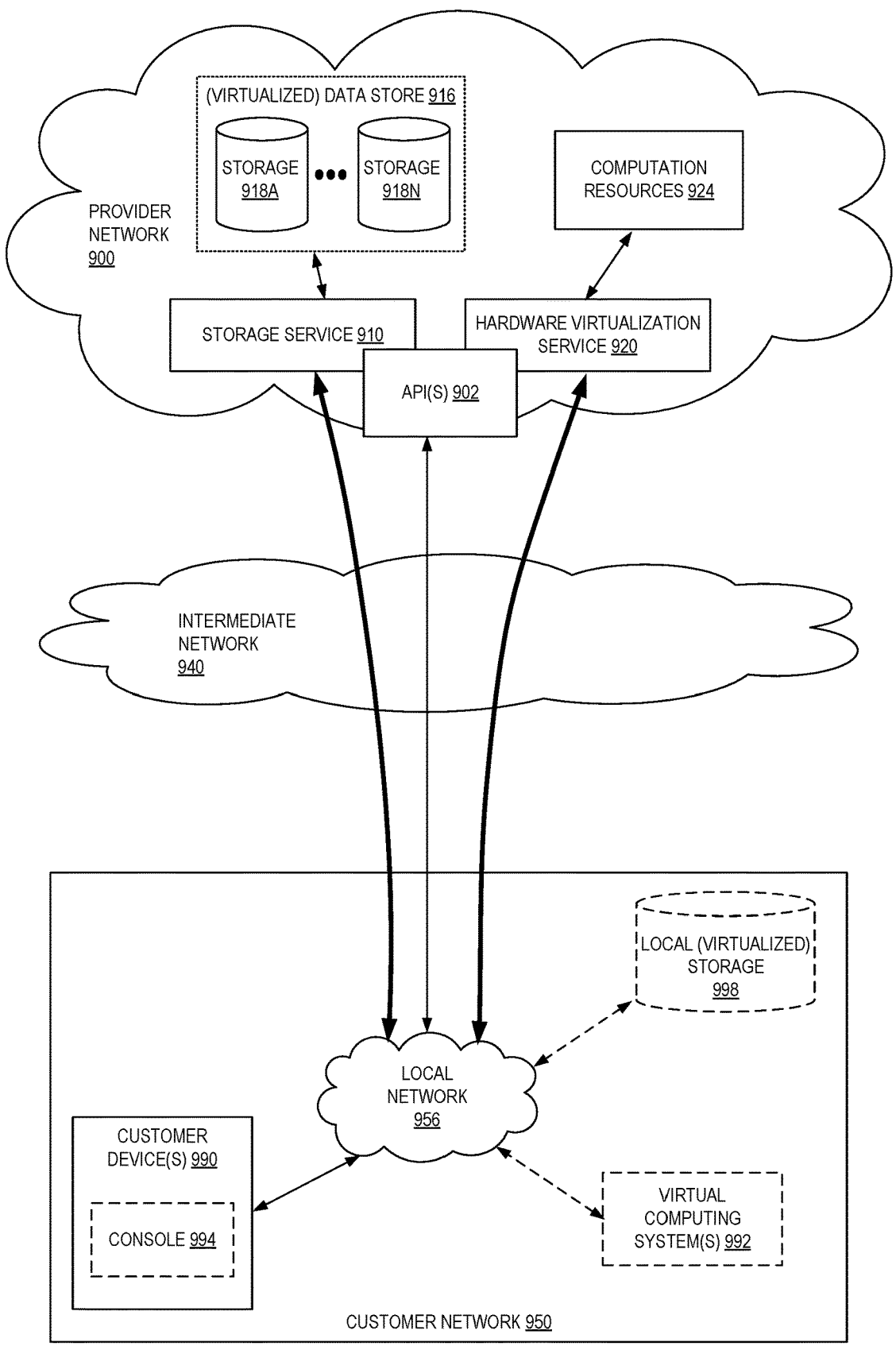
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative Systems

Figure 10:
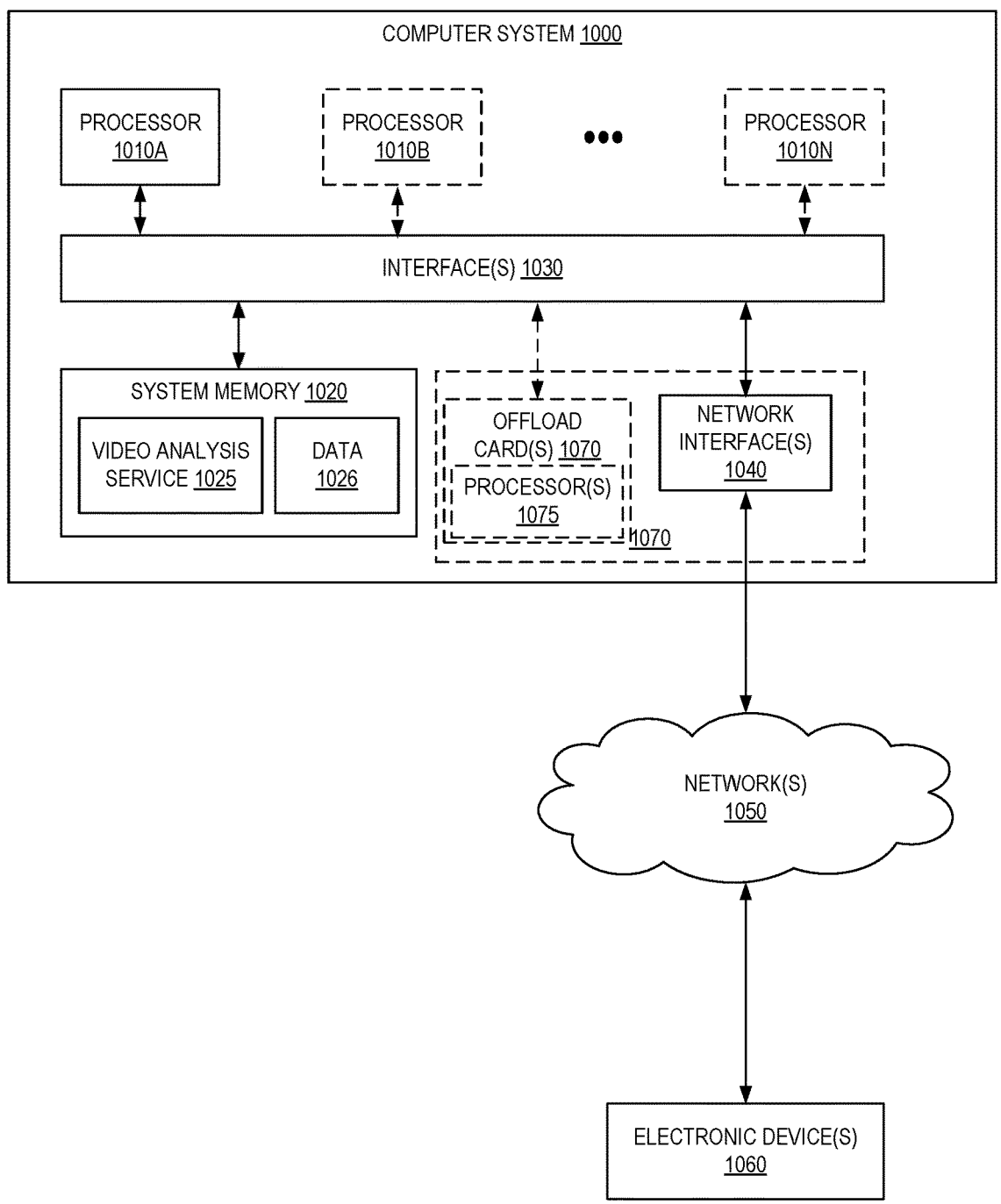
FIG. 10 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as video analysis service code 1025 (e.g., executable to implement, in whole or in part, the video analysis service 105) and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®. Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, an object of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a first application programming interface (API) request to analyze a video, the first API request to include a location of the video and at least one analysis action to perform on the video;
   placing the first API request into a queue;
   polling the queue to retrieve a job associated with the first API request;
   scheduling the job using a global scheduler, the global scheduler to schedule a job queue associated with a segmenter to segment the video into chunks, a chunk processor to analyze the chunks, and a reducer to join results of the analysis;
   accessing the location of the video to retrieve the video using the video segmenter;
   segmenting the accessed video into chunks;
   accessing the job queue for the chunk processor to get one or more chunks to perform the at least one analysis action on, the chunk processor to utilize at least one machine learning model in performing the at least one analysis action;
   accessing, with the reducer, the job queue for the reducer to get a job associated with analysis results to join;
   joining the analyzed chunks to generate a final result;
   storing the final result; and
   providing the final result to a requestor in response to a second API request.

2. The computer-implemented method of claim 1, wherein the first API request is one of a start content moderation request to perform an analysis of content of the stored video, a start object detection request to perform object detection in the stored video, and a start label detection request to perform label detection in the stored video.

3. The computer-implemented method of claim 1, wherein the chunk processor includes a chunk decoder to generate chunk frames that are passed to the at least one machine learning model to perform the at least one analysis action.

4. A computer-implemented method comprising:
receiving a first application programming interface (API) request to analyze a stored video, the first API request to include a location of the stored video and at least one analysis action to perform on the stored video;
scheduling a job for the first API request using a global scheduler, the global scheduler to schedule, based at least in part on available bandwidth of processing components including a segmenter, a chunk processor, and a reducer, at least one job queue associated with at least one of the processing components;
segmenting the accessed video into chunks using the segmenter;
analyzing the chunks using at least one machine learning model of the chunk processor in performing the at least one analysis action;
joining the analyzed chunks to generate a final result using the reducer;
storing the final result; and
providing the final result to a requestor in response to a second API request.

5. The computer-implemented method of claim 4, wherein the first API request requests one of object detection and video analysis.

6. The computer-implemented method of claim 4, wherein the chunk processor includes a chunk decoder to generate chunk frames that are passed to the at least one machine learning model to perform the at least one analysis action.

7. The computer-implemented method of claim 6, wherein the least one machine learning model of the chunk processor is an object detection model.

8. The computer-implemented method of claim 6, wherein the least one machine learning model of the chunk processor is a video analysis model.

9. The computer-implemented method of claim 4, wherein the joining of the results of the processing of each chunk to generate a final result is performed by an aggregator and the final result includes at least one of a per object bounding box, object bounding box, and an object match.

10. The computer-implemented method of claim 4, further comprising:
updating the global scheduler to indicate completion of chunking by the segmenter;
updating the global scheduler to indicate completion of analyzing by the chunk processor; and
updating the global scheduler to indicate completion of joining by the reducer.

11. The computer-implemented method of claim 4, further comprising:
increasing a speed of one of the jobs based on allocated bandwidth.

12. The computer-implemented method of claim 4, wherein computing resources allocable to the segmenter, the chunk processor, and the reducer are dynamic.

13. The computer-implemented method of claim 4, further comprising:
notifying a requestor that the final result is available.

14. A system comprising:
an end user device to send a first request for analysis of stored video;
a web services provider to:
receive the first request to analyze a stored video, the first request to include a location of the stored video and at least one analysis action to perform on the stored video;
schedule a job for the first request using a global scheduler, the global scheduler to schedule, based at least in part on available bandwidth of processing components including a segmenter, a chunk processor, and a reducer, at least one job queue associated with at least one of the processing components;
access the location of the stored video to retrieve the stored video;
segment the accessed video into chunks;
process each chunk with a chunk processor to perform the at least one analysis action, each chunk processor to utilize at least one machine learning model in performing the at least one analysis action;
join the results of the processing of each chunk to generate a final result;
store the final result; and
provide the final result to a requestor in response to a second request.

15. The system of claim 14, wherein the first request is one of a start content moderation request to perform an analysis of content of the stored video, a start object detection request to perform object detection in the stored video, a start label detection request to perform label detection in the stored video, a start object tracking request to perform object tracking in the stored video, and a start object recognition request to perform object detection in the stored video.

16. The system of claim 14, wherein the chunk processor is to include a chunk decoder to generate chunk frames that are passed to the at least one machine learning model to perform the at least one analysis action.

17. The system of claim 16, wherein the least one machine learning model of the chunk processor is an object detection model.

18. The system of claim 16, wherein the least one machine learning model of the chunk processor is a label detection model.

19. The system of claim 14, wherein the joining of the results of the processing of each chunk to generate a final result is performed by an aggregator and the final result includes at least one of a per frame object bounding box, object bounding box, and an object match.

20. The system of claim 14, wherein the first request is received by a front end of the web services provider.

* * * * *